Figure 1:
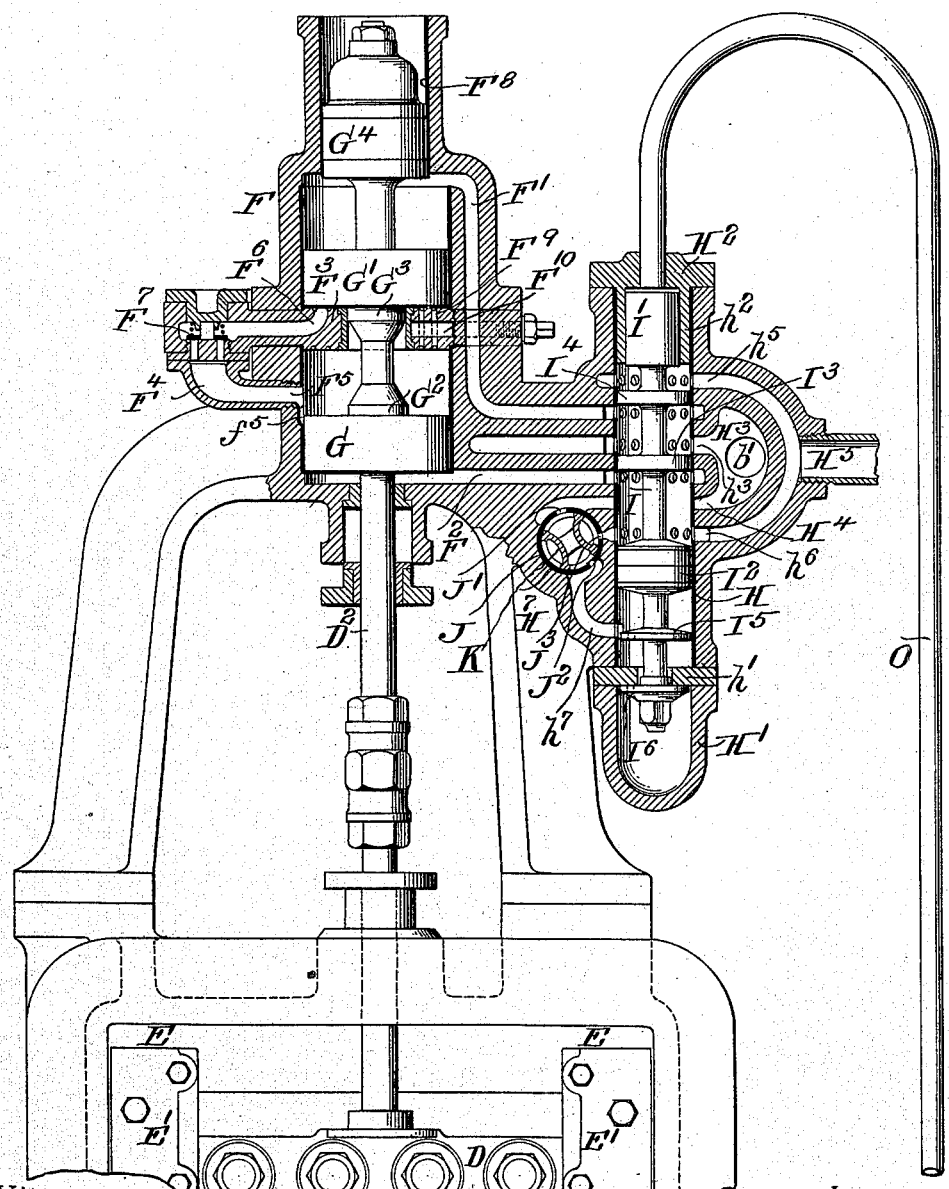

No. 714,603. Patented Nov. 25, 1902.
G. B. PETSCHE.
APPARATUS FOR ACTUATING VALVES OF LIQUID PUMPS.
(Application filed July 31, 1897.)

(No Model.) 7 Sheets—Sheet 1.

Witnesses. Inventor.
Gustav B. Petsche
his Attorney.

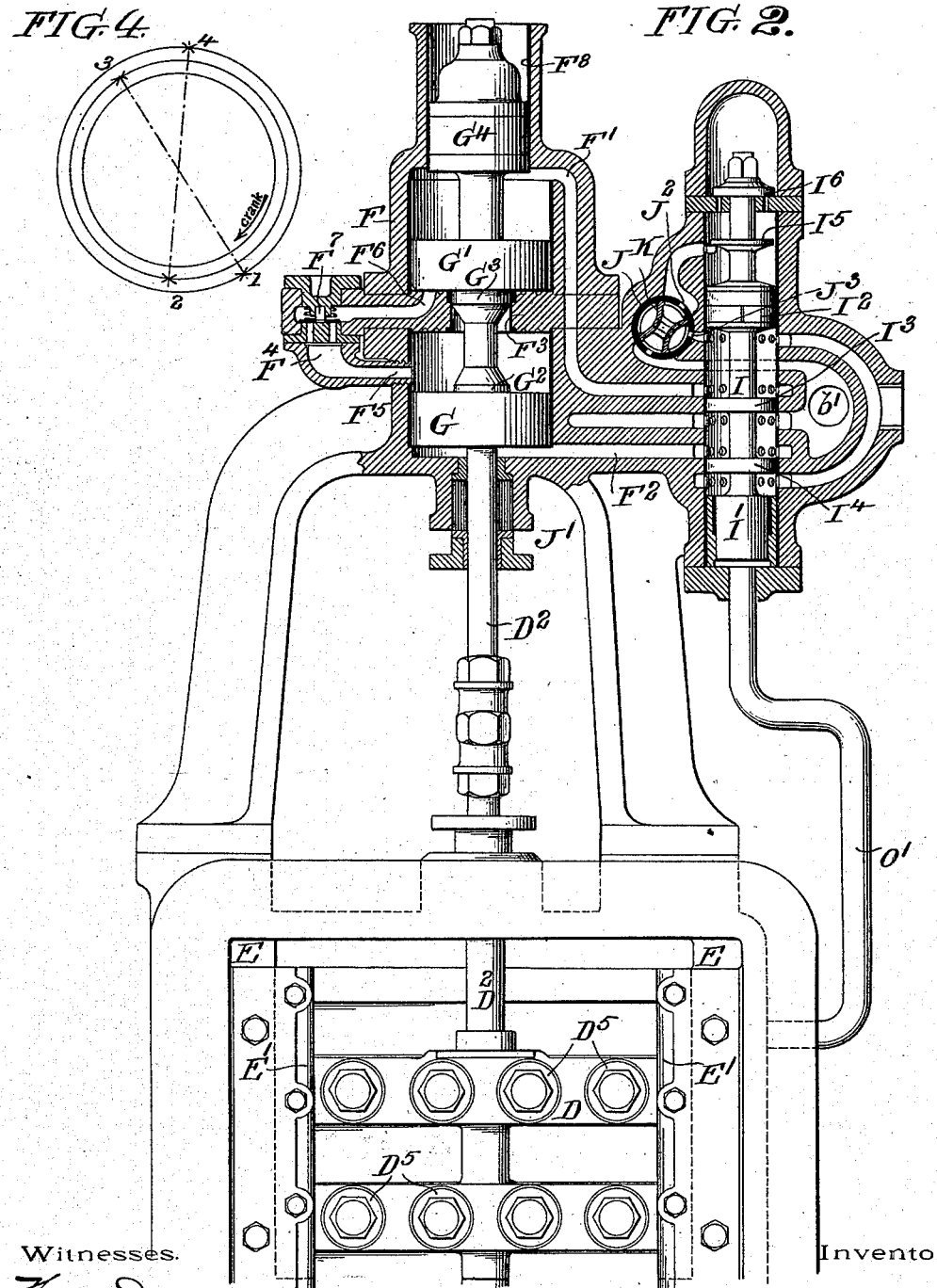

No. 714,603. Patented Nov. 25, 1902.
G. B. PETSCHE.
APPARATUS FOR ACTUATING VALVES OF LIQUID PUMPS.
(Application filed July 31, 1897.)
(No Model.)
7 Sheets—Sheet 3.
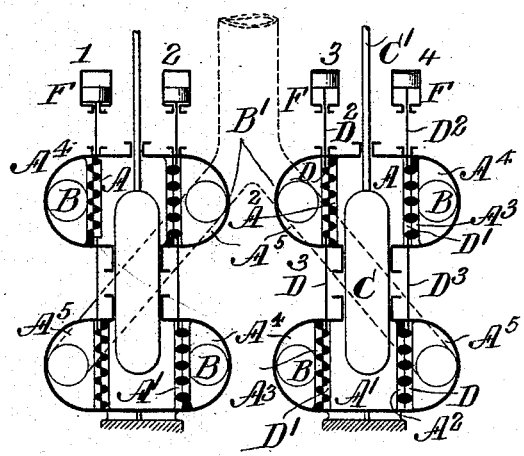
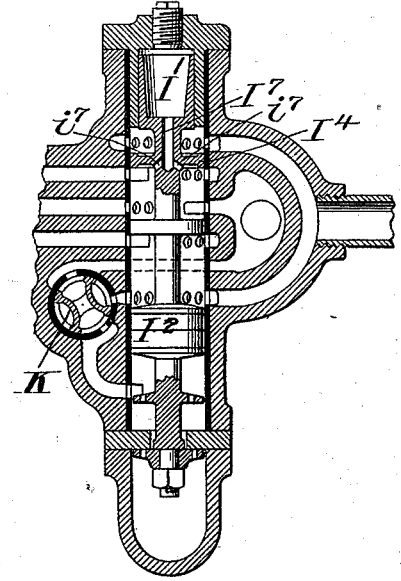
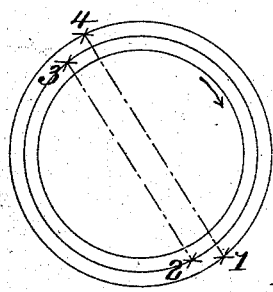
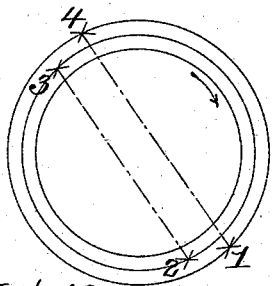
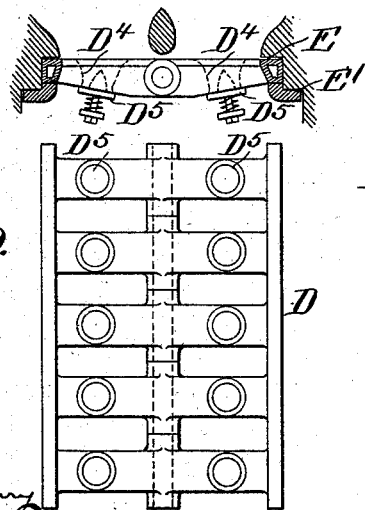
Witnesses.
Inventor.
Gustav B. Petsche
by
Francis T. Chambers
his Attorney.

No. 714,603. Patented Nov. 25, 1902.
G. B. PETSCHE.
APPARATUS FOR ACTUATING VALVES OF LIQUID PUMPS.
(Application filed July 31, 1897.)
(No Model.) 7 Sheets—Sheet 4.
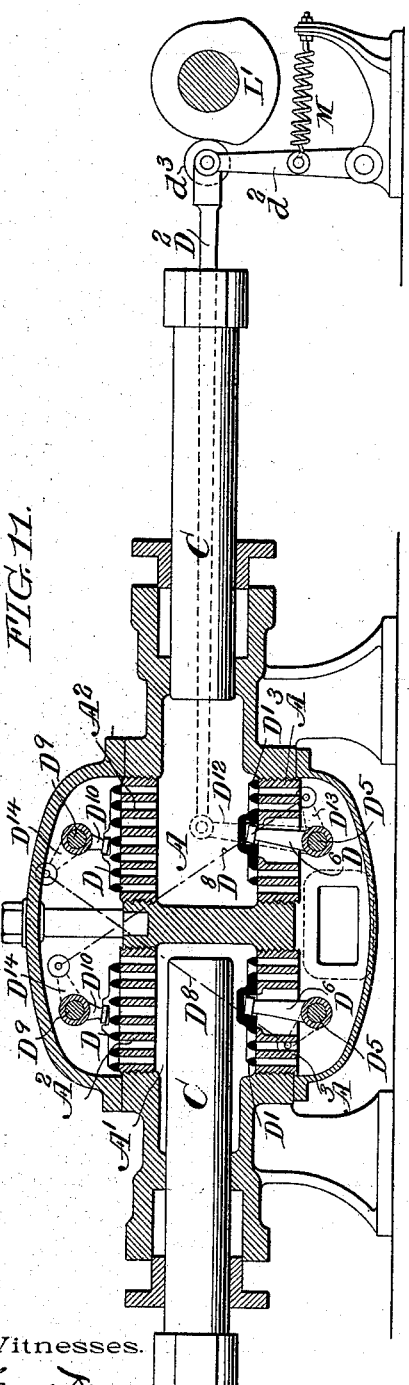
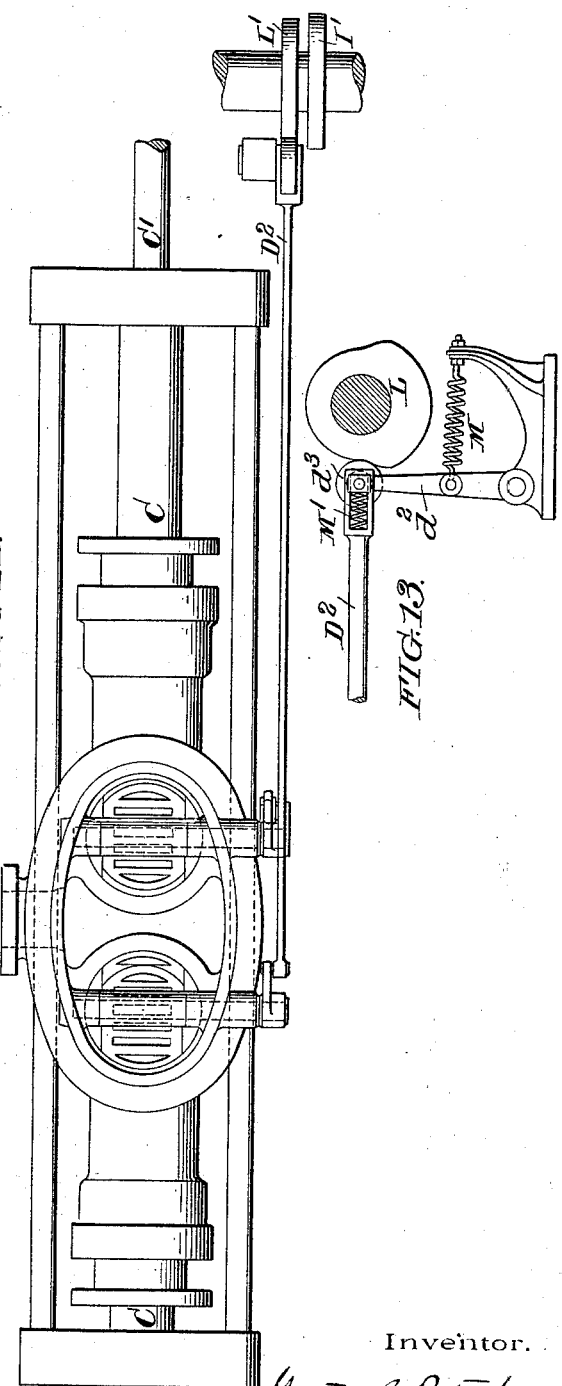
Witnesses. Inventor.
Gustav B. Petsche
his Attorney.

No. 714,603. Patented Nov. 25, 1902.
G. B. PETSCHE.
APPARATUS FOR ACTUATING VALVES OF LIQUID PUMPS.
(Application filed July 31, 1897.)
(No Model.) 7 Sheets—Sheet 5.
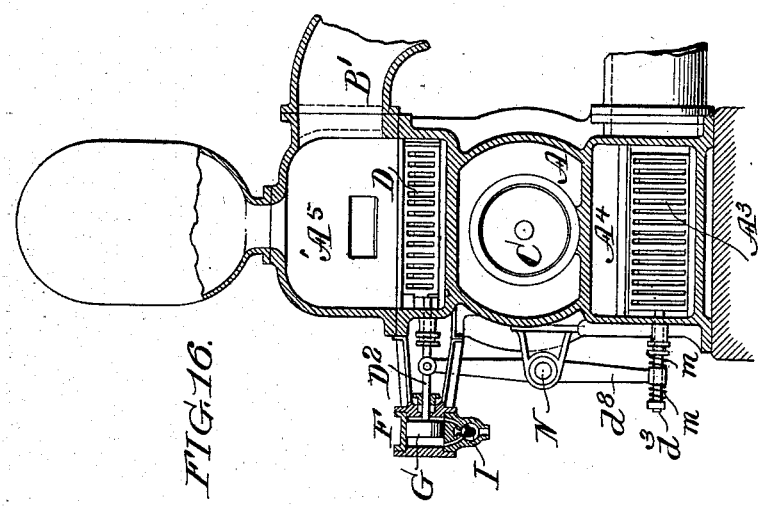
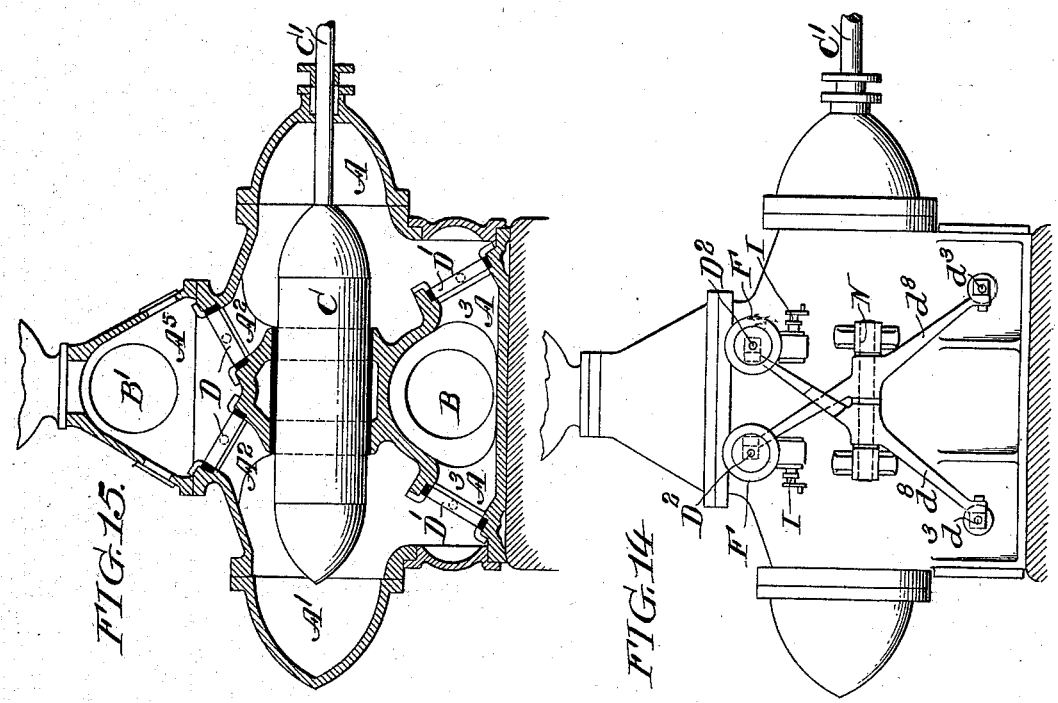
Witnesses. Inventor.
Gustav B. Petsche No. 714,603. Patented Nov. 25, 1902.
G. B. PETSCHE.
APPARATUS FOR ACTUATING VALVES OF LIQUID PUMPS.
(Application filed July 31, 1897.)
(No Model.) 7 Sheets—Sheet 6.
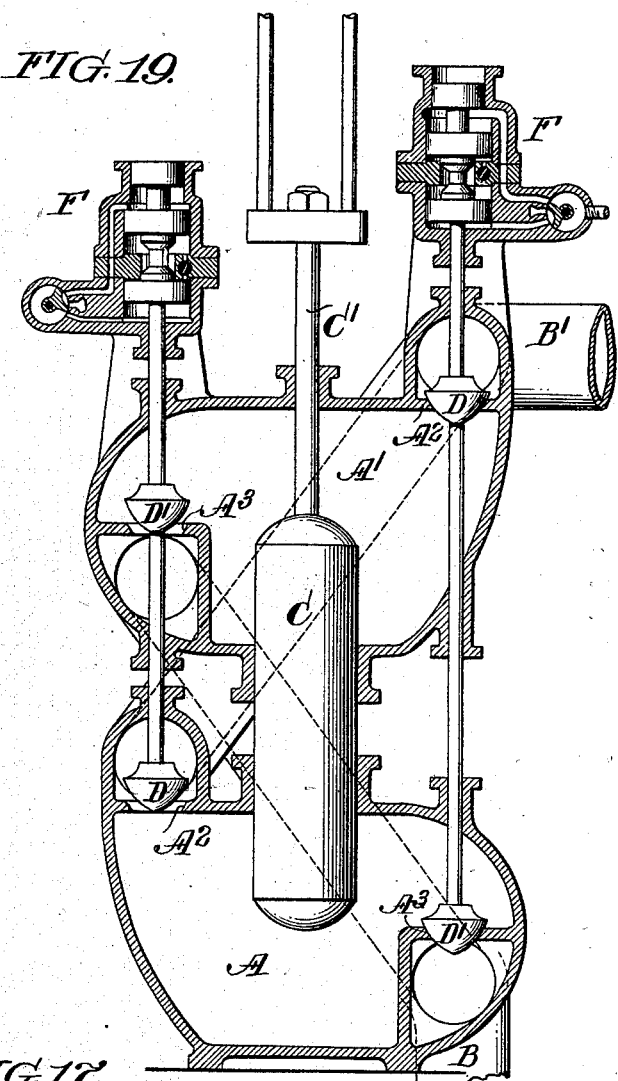
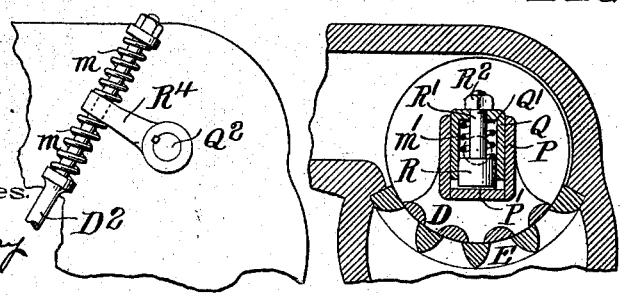

No. 714,603. Patented Nov. 25, 1902.
G. B. PETSCHE.
APPARATUS FOR ACTUATING VALVES OF LIQUID PUMPS.
(Application filed July 31, 1897.)
(No Model.) 7 Sheets—Sheet 7.

UNITED STATES PATENT OFFICE.

GUSTAV BERNHARD PETSCHE, OF PHILADELPHIA, PENNSYLVANIA, ASSIGNOR TO THE SOUTHWARK FOUNDRY & MACHINE COMPANY, OF PHILADELPHIA, PENNSYLVANIA, A CORPORATION OF PENNSYLVANIA.

APPARATUS FOR ACTUATING VALVES OF LIQUID-PUMPS.

SPECIFICATION forming part of Letters Patent No. 714,603, dated November 25, 1902.

Application filed July 31, 1897. Serial No. 646,629. (No model.)

*To all whom it may concern:*

Be it known that I, GUSTAV BERNHARD PETSCHE, a subject of the Emperor of Germany, residing in the city and county of Philadelphia, in the State of Pennsylvania, have invented certain new and useful Improved Apparatus for Actuating Valves of Liquid-Pumps, of which the following is a true and exact description, reference being had to the accompanying drawings, which form a part thereof.

My invention relates to the construction of pumps for liquids, and particularly to the means for actuating pump-valves.

Heretofore pumps for water and other liquids have usually been made with valves of the type generally known as "clack-valves" held to their seats generally by spring-pressure and lifted therefrom to permit the entrance or exhaust of water from the pump-chamber by the pressure of the water. It is usually necessary in large pumps to provide a very large number of such valves, and much trouble is met with in their use not only from the noise which they make in closing and from the fact that they are frequently broken or get out of order, but also because when open they lie immediately in front of the port through which the water issues, and greatly impede its flow. Attempts have heretofore been made to use slide-valves with the object of avoiding the noise of the clack-valve and of giving a freely-open port for the passage of water; but for the most part such attempts have proved unsuccessful, owing to the difficulty of actuating sliding valves at the critical moment when a valve should theoretically open—that is to say, at the point where the pressure within and without the pump-chambers is the same—and of course the same difficulty prevailed as to the closing of the valve, which should take place at the end of the compression-stroke of the plunger in the pump and which if deferred will permit some water in the main to flow back into the pump-chamber, while if it takes place too soon the escape of the water in front of the plunger is prevented, with the liability of bursting the pump.

I am aware that William E. Good, of Philadelphia, has devised a pump in which slide-valves are used and in which he aimed to overcome, and did to a certain extent overcome, the difficulties I have noted by providing for a movement of the slide-valve to and from its seat, so that the valve at the beginning of the expulsion-stroke of the plunger rose from its seat, permitting the flow of water around its edges while positively-moving mechanism was moving it sidewise to open it, and I have to a certain extent availed myself of Mr. Good's invention, which is described in his Patent No. 507,582, dated October 31, 1893, in making my present invention; but in the pump as designed by Mr. Good it was found necessary to give so much freedom of motion from its seat to the valve as to produce an objectionable hammering, and a not infrequent occurrence in the operation of a pump was not provided for—that is to say, the presence of air in the cylinder—which when it occurred brought about the opening of the delivery-valve before the water in the pump-chamber was ready to flow out, such opening having to be accomplished against a greatly preponderating pressure in the main holding the valve to its seat, and as the friction developed is necessarily very great the strain put upon the valve-actuating mechanism was dangerous and not permissible.

The object of my invention is chiefly to provide means for operating valves in pumps by which the difficulties heretofore met with can be entirely overcome and by which the opening of the valve shall be effected automatically at the critical point when the pressures upon both sides of it are equal or approximately equal, and I accomplish this by making use of the resistance developed by the weight or friction of the valve upon its seat while the pressure upon its outside is greater than that upon its inside, and by providing an elastic or yielding actuating force to operate the valve, which is brought into action upon a valve at, or preferably slightly before, the point in the motion of the plunger at which the valve should theoretically open, but which only actually moves the valve when the resistance holding it to its seat is overcome or diminished to a determinate point, and this method of operating upon valves by resistance developed by pressure and by an elastic or yielding actuating force controlled by such resistance constitutes my new method, which forms the subject-matter of my divisional application filed July 19, 1902, while the mechanism for effecting this result forms the subject-matter of the claims appended to this application.

Figure 20:
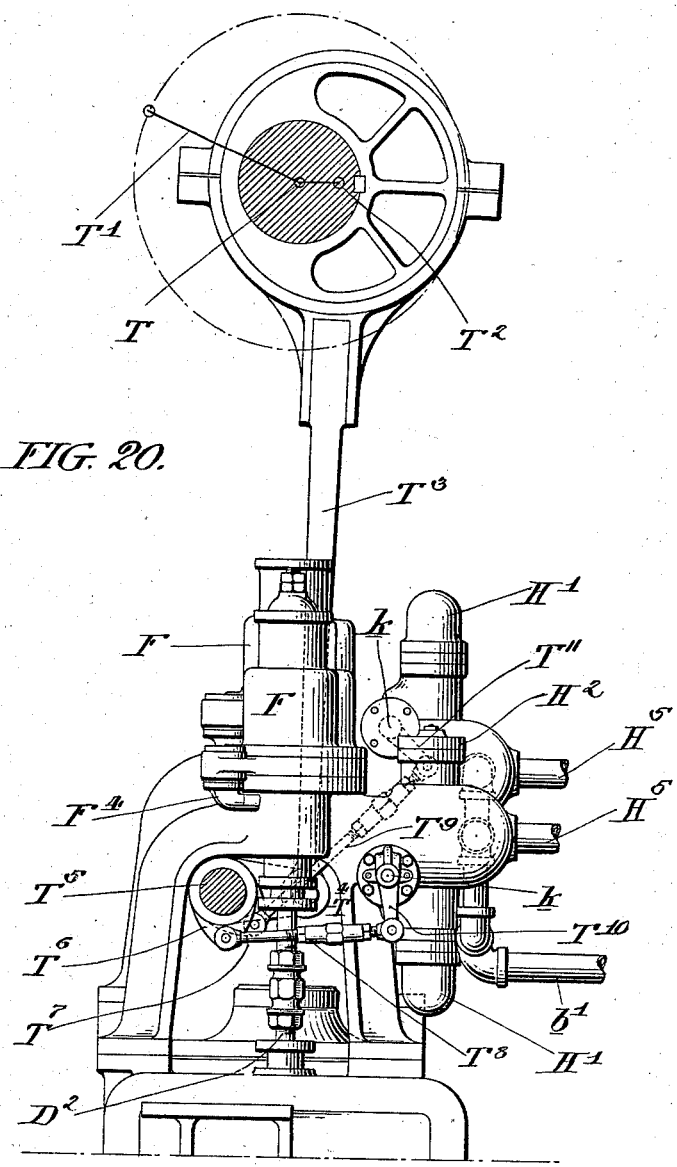

Reference being now had to the drawings, in which my invention is illustrated, Figures 1 and 2 are sectional views illustrating the valve-actuating mechanism as devised and used on a twin quarter-crank double-acting pumping-engine diagrammatically illustrated in Fig. 3. Fig. 4 is a diagram illustrating the action of this mechanism with reference to the movements of the main crank of the pump or engine. Fig. 5 is a sectional view of a modification; Fig. 6, a diagram illustrating the action of this modification. Fig. 7 is a sectional view illustrating still another modification. Fig. 8 is a diagram illustrating the action of this modification. Fig. 9 is a plan view, and Fig. 10 an end view, of a slide-valve such as I prefer to use on engines of the general type illustrated in Fig. 3. Fig. 11 is a sectional side elevation illustrating a simple modification of my valve-actuating mechanism. Fig. 12 is a plan view of the same with the top plate and valves removed. Fig. 13 illustrates a further modification applicable to the engines shown in Figs. 11 and 12. Fig. 14 is a side elevation of another type of engine illustrated in vertical sectional elevation in Fig. 15 and in cross-sectional elevation in Fig. 16. Figs. 17 and 18 illustrate a modification in the form of sliding valve. Fig. 19 illustrates the application of some of the features of my invention to a clack-valve, and Fig. 20 is a side elevation of the part of the pump comprising the valve-actuating mechanism as shown in Figs. 1 and 2, diagrammatically showing the connection with a moving part of the pumping-engine.

A and A' indicate pump-chambers, in which the plungers indicated by the symbol C and operated by the piston-rods C' operate.

$A^2$ $A^2$ indicate the seats of the delivery-valves, and $A^3$ $A^3$ the seats of the suction-valves; $A^4$ $A^4$, the suction-chambers of the pump; $A^5$ $A^5$, the delivery-chambers of the pump.

B B indicate supply-mains, and B' B' the delivery-mains.

D D indicate the delivery-valves, and D' D' the suction-valves.

$D^2$ $D^2$ indicate the actuating valve-rods, and $D^3$ $D^3$, Fig. 3, connecting valve-rods, each connecting the delivery-valve in one pump-chamber with the suction-valve in the corresponding chamber of a double-acting pump, this connection being an appropriate one, because under normal conditions the two valves should open and close together.

The valve which I propose to use in large pumps is of the gridiron character, (indicated in Figs. 9 and 10 of the drawings,) in which E indicates the seat of the valve, and E' its back bearing, and play for the valve between the seat and back bearing of approximately one-sixty-fourth of an inch I have found to be sufficient to obtain the best results. As, however, this capacity for movement away from its seat is too small to permit of the free action of the valve as a snifting-valve, which Good, for instance, contemplates in his application above mentioned, and as it is desirable that the pump should have the capacity of snifting to provide against any possible derangement in the valve-actuating mechanism I preferably form the cross-bars of the valve, as D, with perforations through them, as indicated at $D^4$, and provide snifting-valves of ordinary type, as indicated at $D^5$, to close these perforations, so that in case the sliding valve should not open in time to let the water pass freely through it the pressure of the water will raise the snifting-valves $D^5$ from their seats, permitting a sufficiently free passage to insure against a bursting pressure. Properly arranged, however, these snifting-valves are mere safety devices in my pump and do not come into constant or frequent operation. I may properly mention here that while I prefer to employ the sliding gridiron type of valve my invention is applicable also to rotary or oscillating valves—such, for instance, as are illustrated in Fig. 18—and may be advantageously employed even with the ordinary-used clack-valve, as indicated, for instance, in Fig. 19.

Referring now to Figs. 1, 2, 3, and 4, F indicates a valve-actuating cylinder centrally divided by an inwardly-extending flange $F^3$ and provided with ports F' and $F^2$, leading to its top and bottom for the entrance and exhaust of pressure fluid.

$F^4$ indicates the by-pass opening into the side of one portion of the cylinder, as indicated at $F^5$, and passing thence to the other side of the flange at a point such as is indicated at $F^6$, where the port will not be closed by the piston moving in that portion of the cylinder. $F^7$ indicates a non-return valve situated in this by-pass and arranged to permit the flow of fluid from $F^5$ to $F^6$, but to check any return flow. $F^8$ indicates a contracted extension of the cylinder F.

$F^9$ is a hole or perforation extending through the inwardly-extending flange $F^3$, and $F^{10}$ is an adjustable stop-cock or valve by which the opening through this perforation can be adjusted to any desired extent.

G and G' are pistons rigidly coupled together and moving, respectively, in the part of the cylinder F below and above the flange $F^3$. These pistons are coupled, as shown, to the valve-rod $D^2$, and, as shown in Figs. 1 and 2, the upper piston is coupled to the piston $G^4$, moving in the contracted portion $F^8$ of the cylinder and serving to counterbalance the pressure exerted on the upper face of the piston G', such counterbalancing being in this case provided for because the valves connected with the rod D² are in this construction vertical, and their weight, which in a large engine is very considerable, aids in moving them in a downward direction, while it opposes the action of the piston G in raising them upward.

H is a piston-valve casing in which moves the piston-valve I. The casing, as shown, is closed at the lower end by the casting H' and the central perforated plate $h'$, while at the upper end it is closed by the head H², having formed on it an inwardly-extending cylindrical portion $h^2$ of smaller diameter than the valve-casing H. A connection $b'$ leads from the delivery-main of the pump to the chamber H³, having a port $h^3$ leading into the casing H, and a port H⁴ leads to the controlling-valve, (indicated at K.) Exhaust-passages $h^5$ $h^6$ lead to the exhaust-conduit H⁵. The ports F' and F² also lead into the valve-casing H, as shown. The piston-valve I is made with a head I' fitting in the cylindric portion of the head H² and with a lower head I² moving in a portion of the casing between the ports J³ and $h^7$. Between these heads I' and I² are placed the piston-like extensions I³ and I⁴, which as the piston-valve moves up and down always admit fluid from the port $h^3$ between them, but deliver it alternately to the ports F' and F². The exhaust from these ports takes place above the piston I⁴ when said piston comes below the port F', and below piston I³ when said piston comes above the port F². The annular extensions I⁵ and I⁶ serve simply as stops, regulating the movement of the piston-valves by coming alternatively in contact with the perforated plate $h'$. The valve-casing indicated at J is fitted to a cavity H⁷ in the casting forming the piston-valve casing, and is provided with a port J', which registers with the port H⁴. A port J² opens into the port $h^7$, and a port J³ opens into the piston-valve casing at a point above the uppermost point covered by a piston I².

K is a valve working in a valve-casing J and serving alternately to connect the ports H⁴ and $h^7$ and the ports $h^7$ and J³, and O is a connection leading from the cylinder or chamber of the pump to the top of the piston or head I'. In the arrangement shown in Figs. 1, 2, and 3 it will be noticed that the piston-valve and its connections, as shown in Fig. 1, are reversed in Fig. 2. This is an incident to the peculiar construction illustrated in Fig. 3 of the drawings, the actuating-cylinder shown in Fig. 1 being that which corresponds with cylinders 1 and 4 in Fig. 3, said cylinders raising the valves D and D' to open them and the pipe O leading from the lower pump-chamber A', while the actuating-cylinder shown in Fig. 2 is that corresponding to the cylinders 2 and 3 in Fig. 3, in which the valves actuated by such cylinders move downward to open and upward to close, the pipe O' here leading from the upper cylinder or chamber A. It is proper to say in this connection that I prefer in all cases where vertical valves are used to open them by an upward movement and close them by a downward movement; but the construction shown in the drawings will illustrate the feasibility of either action.

It is of course obvious that the full head of the main delivery-pipe pressure is by the construction illustrated and in accordance with the piston-valve I delivered either above the piston G' or below the piston G, causing the said pistons and the valves connected therewith to move downward or upward, as the case may be. The valve K, which is controlled by a positive moving part of the pumping-engine and moves with a fixed relation to the strokes of the plunger, will when in the position indicated in Figs. 1 and 2 permit the flow of main pressure to the under side of the piston or head I², forcing the piston-valve up or down, as the case may be, as is indicated in the said figures, and this irrespective of the pressure exerted upon the head I', because the said head I' is of smaller area than the head I². The pump-valve being in a downward position, as indicated in Fig. 1, the valve K is turned so as to cut off the connection through the port J' with the delivery-main and connect the port $h^7$ with the port J³ and through it with the exhaust-passage $h^6$, thus removing all pressure from the head I². This movement of the valve K is made with respect to the cylinders 1 and 4 while the plunger C is moving upward and preferably just at the end of its upward stroke, and as soon as it reverses its motion and moves downward the pressure communicated to the water in the lower chamber A' is communicated through the pipe O to the top of the head I', causing the piston-valve to move downward and admitting delivery-main pressure to the under side of the piston G', which is thus caused to move up, carrying the valves D and D' with it. It is obvious, of course, in the reverse direction shown in Fig. 2 it will be the reverse of that described as to Fig. 1, but otherwise is in all details the same. It will be observed that the main pressure applied to open and close the valves will in all cases apply the power to move them with great rapidity, but in yielding form, so that the valve, although under the pull or thrust of its actuating-cylinder, will remain stationary as long as its resistance to movement is greater than the power applied thereto through the actuating-cylinder, while as soon as this frictional resistance disappears the force acting upon the valve will cause it to open or close with great speed.

I have referred to the valves K K as being actuated by a positively-moving part of the pumping-engine, and such motion may be given to them in any convenient way; but in Fig. 20 I have shown a simple and excellent device for driving the valves K K from the main shaft, (diagrammatically indicated at T,) the crank being indicated at T' and the throw and position of an eccentric on the shaft being indicated at $T^2$, while $T^3$ indicates a connecting-rod from the eccentric to a lever $T^4$, extending out from a rock-shaft, (shown at $T^5$.)

$T^6$ and $T^7$ are lever-arms secured to shaft $T^5$ and connected through rods $T^8$ and $T^9$ to lever-arms $T^{10}$ and $T^{11}$, secured to the spindles $k\ k$ of the valves K K.

In view of the fact that the valves in such engines as my invention relates to are generally of very considerable weight and of the further fact that I move these valves, and necessarily so for the proposed results, with great rapidity, it is necessary to check their motion at the end of both their opening and closing strokes, particularly so when the valves are vertical with respect to their descending stroke, to which the weight of the valve of course adds great impetus, and for this purpose I provide elastic abutments or dash-pots for obviating the shock of the valve movement. Preferably I employ the dash-pot illustrated in the drawings and already partially described. Secured to the inner sides of the pistons G and G' are the plungers, indicated at $G^2$ and $G^3$, which are of a size adapted to neatly fit in the central opening of the flange $F^3$, preventing the passage of fluid through this opening from one side of the flange to the other. The length of the plungers will be proportioned to the impetus of the downward motion of the valve, which in Figs. 1 and 2 is greater than that of the upward motion, plunger $G^3$ being therefore longer than plunger $G^2$. The action of the said plungers being as described to cut off the flow of water through the central passage in the flange $F^3$, it is of course necessary to provide another outlet for it, and this I accomplish by forming the passage $F^9$ through the flange regulating the effective orifice, through which the water can pass from one side to the other by means of the adjusting-plug $F^{10}$. While it is necessary to take up the impetus of the valve at the end of its movements, it is equally necessary that the valve should move freely and with great rapidity at the beginning of its motion, and for this reason I provide the by-pass $F^4$ and a non-return valve $F^7$, situated thereon. The use of this device will be understood from a glance at Fig. 1, and imagining the main pressure to be admitted beneath the piston G the plunger $G^3$, filling the opening in the flange $F^3$, would prevent the water lying above the piston G from passing freely into the part of the cylinder lying beneath the upwardly-moving piston G' were it not for the by-pass $F^4$, through which the water flows freely from above the piston G to a point beneath the piston G', while the valve $F^7$ will of course prevent any return flow through the by-pass. Obviously the entrance to the by-pass into the lower cylinder at the point $F^5$ will be closed by the piston G before the plunger $G^2$ enters the opening in the flange $F^3$, and consequently the by-pass will not at all affect the dash-pot action at the end of the upward stroke. I have shown but one by-pass in Figs. 1 and 2, because in practice with the engine especially illustrated in the said figures it was found unnecessary to have a similar by-pass leading from the upper part to the lower part of the cylinder; but in case the valves were moved horizontally two such by-passes, the one leading from each part of the cylinder to the other, would be desirable and even necessary, and of course even with vertically-moving valves the double by-pass might be used, and possibly with material advantage.

I have shown at $f^5$ in Fig. 1 a downward extension of the opening $F^5$, so as to bring its lower edge beneath the lower edge of the piston G when in its uppermost position. This is a method of construction having some advantage in that it provides for a fresh supply of water in the space between the pistons G and G', and such fresh supply is advantageous, because, owing to the great pressure to which this liquid is subjected, a portion of it will undoubtedly be forced out of the space between the pistons, passing between the pistons and the cylinder.

The dash-pot construction above described is in itself new with me and possesses many features of advantage which are applicable in other uses besides connection with actuating-cylinder of liquid-pumps. I have therefore obtained a separate patent, No. 632,744, dated September 12, 1897, to cover the said improvement, in the present case only claiming the device in its combination with a mechanism peculiar to the pump, pump-valves, and their actuating connections.

To explain the proper timing of the valve movement, or rather the pressure-controlling valve effecting the valve movement, I would refer to the diagram illustrated in Fig. 4, in which the inner circle indicates the crank of the pump and the arrow its direction of rotation. The outer circle relates to and illustrates the arcs appropriate to the admission of fluid to the two ends of the piston-valve in Fig. 1, and the intermediate circle illustrates the arcs appropriate to the admission of fluid to the ends of the piston-valve. (Shown in Fig. 2.) Thus it will be seen with reference to the piston-valve casing in Fig. 1 that water is admitted or flows into the upper end of the casing, so as to act upon the head $H^2$ when the pump-crank is at the point indicated at 4 in the diagram, while the positively-actuated valve K, operated in connection with this valve of Fig. 1, is opened so as to admit the main pressure on the lower side of the head $I^2$ at a point indicated at 1 in the diagram. The admission of the impelling fluid to the top I' of the piston-valve taking place slightly after the crank has crossed the center, and the admission of the main pressure to the under side of the piston-valve $I^2$ taking place considerably before the crank has passed the opposite center, and with reference to the construction shown in Fig. 2, it will be seen that the water is admitted through the pipe O' to the under side of the reversed piston-valve at the point indicated at 2, which is slightly after the passage of the crank over its lower center, while the main pressure is admitted through the valve K to the upper side of the piston-valve $I^2$, as indicated at 3, considerably in advance of the passage of the crank over its upper center.

In the construction illustrated in Fig. 5 I have disconnected the piston-valve casing from direct connection with either of the pump-chambers forming the passages $I^7$ $I^7$, leading from the under side of the ring $I^4$ to the top or upper side of the head I', so that the main pressure will always be admitted to act upon the same head, while, as in the previously-explained construction, it is only admitted intermittently and in accordance with the movements of the valve K to act upon the other head $I^2$. It will be obvious that by this construction the piston-valve will always move upward when the main pressure is admitted beneath the head $I^2$ and immediately move downward when said pressure is cut off from beneath the head $I^2$, as such pressure will remain at all times acting upon the smaller head I'. The admission of the motive fluid by this construction is illustrated in the diagram Fig. 6, where the inner circle and arrow denote the pump-crank and its direction of rotation and which indicates that the valve K is turned so as to release the pressure beneath the head $I^2$ when the crank is at a point 4 in advance of the passage of the crank over its upper center and admitted again to the under side of the head $I^2$ when it reaches the point indicated at 1, also in advance of the passage of the crank over its lower center, the points marked 3 and 2 indicating, respectively, the positions of the pump-crank at the points of admission and release of the water from the head $I^2$ in the arrangement of the valve as indicated in Fig. 2.

In Fig. 7 I have indicated another construction, in which the motion of the piston-valve is both controlled and directly effected by the positively-moving part of the engine. In this case a cam L works in the head $I^9$, attached to the piston-rod $I^8$ of the simple piston-valve I, having only the rings $I^4$ and $I^3$ to control the admission and exhaust of the motive fluid to and from the ports F' and $F^2$. The diagram Fig. 8, which is similar to that of Fig. 6, illustrates the admission of fluid by this construction, the water being admitted to the under side of the piston G when the crank is at the point 4 and admitted to the upper side of the piston G' when it is at the point indicated at 1 with respect to the actuating-cylinders 1 and 4, while the points 3 and 2 indicate the similar admission-points with respect to the cylinders 2 and 3.

While I greatly prefer to utilize in the actuating-cylinder a pressure fluid preferably taken from the main to actuate the valves of the pump, my invention in its broader sense may be effective by its use of any elastic impelling force brought into action upon the valves at the proper times, preferably somewhat in advance of the normal point of motion, as already explained, and in Figs. 11, 12, and 13 of the drawings I have illustrated a simple construction in which springs are used instead of the actuating-cylinders. In a construction shown in Figs. 11 and 12 a cam L' imparts motion to a rod $D^2$, supported on a working arm $d^2$ and held against the cam by the action of the spring M, $d^3$ indicating a cam-roller resting in contact with a cam-surface. The motion of the rod $D^2$ is communicated in this construction to the admission-valves D' through levers $D^{12}$ attached to rock-shaft $D^5$ and connecting with the valve by lever-fingers $D^6$ as shown; and as shown also a third lever $D^{13}$ on the rock-shaft $D^5$ connects through a rod $D^8$ with a lever $D^{14}$ on a rock-shaft $D^9$ with which a finger-lever $D^{10}$ connects with and moves the delivery-valve D. In this construction the motion to close the valve is a positive one directly effected by the cam L', while the motion to open the valve is effected by the action of the spring M and will, for the reasons I have already explained, take place only if the pressures are substantially equalized on each side of the valve. In the modification shown in Fig. 13 I have provided a spring M' interposed between the cam-roller $D^3$ and the end of the rod $D^2$, which has the effect of making the pressure in both directions elastic.

In all the constructions heretofore shown and explained I have provided for a positive connection between simultaneously-moving admission and discharge valves in a twin pump. It is, however, advantageous in many cases to provide for an independent motion of each valve, so that with respect to each of them the time of opening will be regulated by the equalization of pressure upon it. This can of course be effected by providing an independent yielding device for moving each valve; but it can also and preferably be effected as indicated in Fig. 16, the details of a pump shown in this figure being further elaborated in Figs. 14 and 15. In this construction an actuating-cylinder F is provided and directly connected with each delivery-valve, a valve I governing the admission and exhaust of pressure fluid on each side of piston G. As in the cases already illustrated, I provide that the same actuating-cylinder F shall act not only upon the delivery-valve, but upon the suction-valve moving in substantial unison with it. I secure this result in the plans shown by the pivoted rock-levers $d^8$, secured to the piston-rod $D^2$ at one end, turning on the pivot N at the center and connected with the valve-rods $d^3$ of the suction-valves through springs m m, thus providing that any motion imparted to the delivery-valve will at once communicate power to move the corresponding suction-valve in the same direction, but providing also that if it is communicated at all it shall be of a yielding character, which will permit the suction-valve to remain stationary in case the equalization of the pressure upon it has not reached a determinate amount.

My invention is equally applicable to oscillating cylindric valves as to flat gridiron-valves such as are illustrated in the figures already referred to, and I have illustrated such an application in Figs. 17 and 18 of the drawings, in which the valve D, working on a segmental valve-seat E, is provided with a yoke P, sliding upon a guide-block Q, secured to an oscillating valve-stem $Q^2$, the valve when seated having the bottom of the yoke (indicated at P') at some distance from the guide-block Q, so that it will be free to move to and from its seat. I have shown cavities Q', formed in the guide-block Q, in which are secured springs $m'$, held in place by and acting against the plunger-head R, which by means of the bolt R' and adjusting-nut $R^2$ is secured to the top of the guide-block. By adjusting this nut any desired distance may be left between the plunger and the bottom P' of the yoke to give free motion to the valve away from its seat, while a further freedom of motion of the valve from its seat is rendered possible by compression of the spring $m'$. This construction of valve, I may state, is in itself my invention and forms the subject-matter of a patent granted to me April 10, 1900, No. 647,153. As shown, a lever $R^4$ is attached to a valve-actuating rod $Q^2$, and the yielding force to operate the valve may be applied to this lever in any convenient way. As shown, I have connected it with the rod $D^2$ through springs $m\ m$.

As stated above, my invention may be usefully applied in some parts to pumps provided with clack-valves, and I have illustrated such a construction diagrammatically in Fig. 19 of the drawings, showing the suction and delivery valve, which opens at the same time, as coupled together, as in former figures. I might mention that it would be desirable in this mode of coupling valves together that they should have elastic faces. Rigidly-coupled metallic valves would be difficult to keep at such exact distances from each other as to seat themselves simultaneously. It is unnecessary to explain the action of the pump illustrated in Fig. 19, as it will be obvious from what has already been said with respect to the other modifications of my invention. The advantage in this construction would be that at the proper time for their opening the valves would be rapidly carried away from their seats by the action of the valve-actuating cylinders and held at such a distance above their seats as to interfere less than is commonly the case with the flow of water, while the return of the valves to their seats could be accomplished with great rapidity, but with the avoidance of the noisy and injurious blow which such valves receive on their seating themselves if the dash-pot principle was applied to check their movement just before they actually seat themselves.

Having described my invention, what I claim as new, and desire to secure by Letters Patent, is—

1. In a pump for liquids the combination with the pump-cylinder and plunger working therein, of a valve controlling the entrance of liquid to the cylinder, and means controlled by a constantly-acting part of the engine for intermittently acting on said valve to open it with a yielding pressure said means being regulated to act on the valve at or before the point in the motion of the plunger where the valve should normally open and being insufficient in amount to overcome the pressure on the valve tending to keep it shut incident to the forcing stroke of the plunger, but sufficient to energetically open the valve when the pressure on its inner and outer faces is substantially equal.

2. In a pump for liquids the combination with the pump-cylinder and plunger working therein of a valve controlling the discharge of liquid from the cylinder, and means controlled by a constantly-acting part of the engine for alternately acting on said valve to open it with a yielding pressure said means being regulated to act on the valve at or before the point in the motion of the plunger where the valve should normally open and being insufficient in amount to overcome the pressure on the valve, tending to keep it shut, incident to the sucking stroke of the plunger, but sufficient to energetically open the valve when the pressure on its inner and outer faces is substantially equal.

3. In a pump for liquids the combination with the pump-cylinder and plunger working therein of a valve operating by a sliding side-wise motion over a port in the cylinder to control the passage of fluid and having its back bearing arranged to give the valve a slight freedom of motion to or from its seat, and means controlled by a constantly-acting part of the engine for intermittently acting on said valve to open it with a yielding pressure said means being regulated to act on the valve at or before the point in the motion of the plunger where the valve should normally open and being insufficient in amount to overcome the pressure on the valve tending to keep it shut incident to the pressure of fluid on its outer face, but sufficient to energetically open the valve when the pressure on its inner and outer faces is substantially equal.

4. In a pump for liquids the combination with the pump-cylinder and plunger working therein of a valve operating by a sliding sidewise motion over a port in the cylinder to control the passage of fluid and having its back bearing arranged to give the valve a slight freedom of motion to or from its seat and means controlled by a constantly-acting part of the engine for alternately acting on said valve to operate it with a yielding pressure said means being regulated to act on the valve at or before the points in the motion of the plunger where the valve should normally open or close and being insufficient in amount to overcome the normal pressure on the valve tending to keep it in a fixed position, but sufficient to energetically move the valve when the pressure on its inner and outer faces is substantially equal.

5. In a pump for liquids the combination with the pump-cylinder and plunger working therein of a valve operating by a sliding sidewise motion over a port in the cylinder to control the passage of fluid and having its back bearing arranged to give the valve a slight freedom of motion to or from its seat, means controlled by a constantly-acting part of the engine for alternately acting on said valve to operate it with a yielding pressure said means being regulated to act on the valve at or before the points in the motion of the plunger where the valve should normally open or close and being insufficient in amount to overcome the normal pressure on the valve tending to keep it in a fixed position but sufficient to energetically move the valve when the pressure on its inner and outer faces is substantially equal and a snifting valve or valves also connecting the pump-cylinder with the chamber or conduit between which and the cylinder the sliding valve aforesaid is situated.

6. In a pump for liquids the combination with the pump-cylinder and plunger working therein of a valve controlling the passage of liquid, means controlled by a constantly-acting part of the engine for alternately acting on said valve to operate it with a yielding pressure and means regulated to act on the valve at or before the points in the motion of the plunger where the valve should normally open or close and being insufficient in amount to overcome the normal pressure on the valve tending to keep it in a fixed position, but sufficient to energetically move the valve when the pressure on the inner and outer faces is substantially equal and yielding cushioning devices arranged to check the motion of the valve at the end of its stroke in both directions.

7. In a pump for liquids the combination with the pump-cylinder and plunger working therein of a valve operating by a sliding sidewise motion over a port in the cylinder to control the passage of liquid and having its back bearing arranged to give the valve a slight freedom of motion to or from its seat, means controlled by a constantly-acting part of the engine for alternately acting on said valve to operate it with a yielding pressure said means being regulated to act on the valve at or before the points in the motion of the plunger where the valve should normally open or close and being insufficient in amount to overcome the normal pressure on the valve tending to keep it in a fixed position, but sufficient to energetically move the valve when the pressure on its inner and outer faces is substantially equal and yielding cushioning devices arranged to check the motion of the valve at the end of its stroke in both directions.

8. In a pump for liquids the combination with the pump-cylinder and plunger working therein of a valve, a valve-actuating cylinder and piston, a source of fluid-pressure connecting with said valve-actuating cylinder and a governing-valve actuated by a constantly-moving part of the engine and arranged to control the passage of the motive fluid so as to apply yielding pressure to move the valve at or before the points in the motion of the plunger whereat it should normally move to open or close and being insufficient in amount to overcome the normal pressure on the valve tending to keep it in a fixed position, but sufficient to energetically move the valve when the pressure on its inner and outer faces is substantially equal.

9. In a pump for liquids the combination with the pump-cylinder and plunger working therein of a valve operating by a sidewise sliding motion over a port in the cylinder, a valve-actuating cylinder and piston, a source of fluid-pressure connecting with said valve-actuating cylinder and a governing-valve actuated by a constantly-moving part of the engine and arranged to control the passage of the motive fluid so as to apply yielding pressure to move the pump-valve at or before the points in the motion of the plunger whereat it should normally move to open or close and being insufficient in amount to overcome the normal pressure on the valve tending to keep it in a fixed position, but sufficient to energetically move the valve when the pressure on its inner and outer faces is substantially equal.

10. In a pump for liquids the combination with the pump-cylinder and plunger working therein of a valve operating by a sidewise sliding motion over a port in the cylinder, a valve-actuating cylinder and piston, a source of fluid-pressure connecting with said valve-actuating cylinder, a governing-valve actuated by a constantly-moving part of the engine and arranged to control the passage of the motive fluid so as to apply yielding pressure to move the pump-valve at or before the points in the motion of the plunger whereat it should normally move to open or close and being insufficient in amount to overcome the normal pressure on the valve tending to keep it in a fixed position, but sufficient to energetically move the valve when the pressure on its inner and outer faces is substantially equal, and one or more snifting-valves also connecting the pump-cylinder with the chamber or conduit between which and the cylinder the sliding valve aforesaid is situated.

11. In a pump for liquids the combination with the pump-cylinder and plunger working therein of a valve, a valve-actuating cylinder and piston, dash-pots arranged to check the motion of the piston in the cylinder at both ends of its stroke, a source of fluid-pressure connecting with said valve-actuating cylinder and a governing-valve actuated by a constantly-moving part of the engine and arranged to control the passage of the motive fluid so as to apply yielding pressure to move the pump-valve at or before the points in the motion of the plunger whereat it should normally move to open or close and being insufficient in amount to overcome the normal pressure on the valve tending to keep it in a fixed position, but sufficient to energetically move the valve when the pressure on its inner and outer faces is substantially equal.

12. In a pump for liquids the combination with the pump-cylinder and plunger working therein, of a valve operating by a sidewise sliding motion over a port in the cylinder a series of snifting-valves secured to and controlling ports formed in the sliding valve and means controlled by a constantly-moving part of the engine for applying yielding pressure to open and close the sliding valve, said pressure being insufficient in amount to overcome the normal pressure on the valve tending to keep it shut, but sufficient to energetically open the valve when the pressure on its inner and outer faces is substantially equal.

13. In a pump for liquids the combination with the pump-cylinder and the plunger working therein, of a valve controlling the flow of liquid, a valve-actuating cylinder and piston, a connection from the receiver or main supplied by the pump to the valve-actuating cylinder, a piston-valve cylinder situated in said connection, a piston-valve working in said cylinder to govern the passage of pressure liquid therethrough, said valve having heads of different area, a conduit connecting the pump with the cylinder at the smaller end of the piston-valve another conduit connecting the main with the cylinder at the larger end of the piston-valve, a valve situated in said last-mentioned conduit whereby the passage of the pressure fluid from the main to the cylinder can be regulated and means for actuating said last-mentioned valve controlled by a moving part of the engine.

14. In a pump for liquids the combination with the pump-cylinder and the plunger acting therein of a laterally-movable valve having also a slight freedom of movement to and from its seat, a valve-actuating cylinder having an inwardly-projecting flange at or near its center, valve-actuating pistons working in said cylinder and attached to a piston-rod one on each side of the flange of the cylinder and a distance apart sufficient to allow said pistons to move the pump-valve through its proper throw, supplemental pistons as $G^2$ $G^3$ secured to each of the pistons aforesaid and formed to substantially fill and close the space between the piston-rod and the inner periphery of the inward flange of the cylinder at the end of the movements of the pistons, a source of fluid-pressure, connections to each end of the valve-actuating cylinder and a valve or valves controlling the admission and exhaust of the pressure fluid to and from the cylinder.

15. In a pump for liquids the combination with the pump-cylinder and the plunger acting therein of a laterally-movable valve having also a slight freedom of movement to and from its seat, a valve-actuating cylinder having an inwardly-projecting flange at or near its center, valve-actuating pistons working in said cylinder and attached to a piston-rod one on each side of the flange of the cylinder and a distance apart sufficient to allow said piston to move the pump-valve through its proper throw, supplemental pistons as $G^2$ $G^3$ secured to each of the pistons aforesaid and formed to substantially fill and close the space between the piston-rod and the inner periphery of the inward flange of the cylinder at the end of the movements of the pistons, a port and non-return valve as $F^4$ $F^7$ arranged to permit a free flow of fluid from one side of the flange to the other at the beginning of the piston's motion and to be closed by the piston after the supplemental piston on the opposite main piston is retracted from the flange, a source of fluid-pressure, connections to each end of the valve-actuating cylinder and a valve or valves controlling the admission and exhaust of the pressure fluid to and from the cylinder.

16. In a pump for liquids the combination with the pump-cylinder and the plunger acting therein of a laterally-movable valve having a vertical stroke and also a slight freedom of movement to and from its seat, a vertical valve-actuating cylinder having an inwardly-projecting flange at or near its center, valve-actuating pistons working in said cylinder and attached to a piston-rod one on each side of the flange of the cylinder and at a distance apart sufficient to allow said pistons to move the pump-valve through its proper throw, supplemental pistons as $G^2$ $G^3$ secured to each of the pistons aforesaid and formed to substantially fill and close the space between the piston-rod and the inner periphery of the inward flange of the cylinder at the end of the movements of the pistons, the upper piston $G^3$ being longer than the lower piston $G^2$, a source of fluid-pressure, connections to each end of the valve-actuating cylinder and a valve or valves controlling the admission and exhaust of the pressure fluid to and from the cylinder.

17. In a pump for liquids the combination with the pump-cylinder and the plunger acting therein, of a laterally-movable valve having a vertical stroke and also a slight freedom of movement to and from its seat, a vertical valve-actuating cylinder having an inwardly-projecting flange at or near its center, valve-actuating pistons working in said cylinder and attached to a piston-rod one on each side of the flange of the cylinder and at a distance apart sufficient to allow said piston to move the pump-valve through its proper throw, supplemental pistons as $G^2$ $G^3$ secured to each of the pistons aforesaid and formed to substantially fill and close the space between the piston-rod and the inner periphery of the inward flange of the cylinder at the end of the movements of the pistons, the upper piston $G^3$ being longer than the lower piston $G^2$, a port and non-return valve as $F^4$ $F^7$ arranged to permit a free flow of fluid from the lower side of the flange to the upper at the beginning of the piston's upward motion and to be closed by the piston after the supplemental piston $G^3$ on the opposite upper piston is retracted, a source of fluid-pressure, connections to each end of the valve-actuating cylinder and a valve or valves controlling the admission and exhaust of the pressure fluid to and from the cylinder.

18. In a pump for liquids the combination with two cylinders and a plunger working between them, of suction and delivery ports for each cylinder, laterally-moving valves arranged to control said ports and to have a slight vertical freedom of motion to and from their seats, means for coupling the suction-valves of each cylinder with the delivery-valves of the other cylinder so that said valves will be acted on to open and close them simultaneously, means whereby a yielding force is applied to each pair of coupled valves to open or close them and means whereby said force is controlled by a positively-moving part of the engine.

19. In a pump for liquids the combination with two cylinders and a plunger working between them, of suction and delivery ports for each cylinder, laterally-moving valves arranged to control said ports and to have a slight vertical freedom of motion to and from their seats, means for coupling the suction-valves of each cylinder with the delivery-valves of the other cylinder so that said valves will be acted on to open and close them simultaneously, said means being of a yielding character as described and so that one valve may move slightly in advance of the other, means whereby a yielding force is applied to each pair of coupled valves to open or close them and means whereby said force is controlled by a positively-moving part of the engines.

20. In a pump, the combination with the pump-chamber and plunger moving therein, of a vertically-moving slide-valve controlling a port of said chamber and arranged when closed to be held to its seat by the pressure of fluid on its back, and to remain closed till the pressures on opposite sides are substantially equal, means for operating said valve by applying in advance of the time of movement a yielding pressure insufficient at the moment of application to overcome the pressure holding the valve to its seat and means controlled by the movements of the pump for intermittently applying said yielding pressure to the valve at or in advance of the normal time of movement of the valve.

21. In a pump the combination with the pump-chamber and the plunger working therein, of a vertically-moving slide-valve controlling a port of said chamber and arranged when closed to be held to its seat by the fluid-pressure on its back and to remain closed till the pressure on opposite sides is substantially equal, a valve-actuating cylinder and piston, a connection from a source of pressure fluid to the ends of said valve-actuating cylinder, a controlling-valve governing the flow and exhaust of pressure fluid to and from the valve-actuating cylinder, and means for actuating said controlling-valve actuated by the movements of the pump and whereby it is actuated to admit pressure to the valve-actuating cylinder at or in advance of the time of movement of the valve.

22. In a pump the combination with the pump-chamber and the plunger working therein of a vertically-moving slide-valve controlling a port of said chamber and arranged when closed to be held to its seat by the fluid-pressure on its back and to remain closed till the pressures on opposite sides are substantially equal, a valve-actuating cylinder and piston situated above the valve, said piston serving as a support thereto, a connection from a source of pressure fluid to the ends of said valve-actuating cylinder, a controlling-valve governing the flow and exhaust of pressure fluid to and from the valve-actuating cylinder, and means for actuating said controlling-valve actuated by the movements of the pump and whereby it is actuated to admit pressure fluid to the valve-actuating cylinder at or in advance of the time of movement of the valve.

GUSTAV BERNHARD PETSCHE.

Witnesses:
CHAS. F. MYERS,
D. STEWART.